(12) United States Patent
Mipo et al.

(10) Patent No.: US 12,155,283 B2
(45) Date of Patent: Nov. 26, 2024

(54) ROTARY ELECTRICAL MACHINE WITH AN OPTIMISED CONFIGURATION

(71) Applicant: Valeo Equipements Electriques Moteur, Creteil (FR)

(72) Inventors: Jean Claude Mipo, Creteil (FR); Sophie Personnaz, Creteil (FR); Zi-Qiang Zhu, Creteil (FR); Srinivas Mallampalli Satsai, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 898 days.

(21) Appl. No.: 17/260,086

(22) PCT Filed: Jul. 26, 2019

(86) PCT No.: PCT/EP2019/070222
§ 371 (c)(1),
(2) Date: Jan. 13, 2021

(87) PCT Pub. No.: WO2020/021087
PCT Pub. Date: Jan. 30, 2020

(65) Prior Publication Data
US 2021/0288540 A1    Sep. 16, 2021

(30) Foreign Application Priority Data
Jul. 26, 2018   (FR) ...................... 1856963

(51) Int. Cl.
*H02K 3/28* (2006.01)
*H02K 1/276* (2022.01)
*H02K 29/03* (2006.01)

(52) U.S. Cl.
CPC ............... *H02K 3/28* (2013.01); *H02K 1/276* (2013.01); *H02K 29/03* (2013.01)

(58) Field of Classification Search
CPC ........... H02K 3/28; H02K 29/03; H02K 1/276
See application file for complete search history.

(56) References Cited

U.S. PATENT DOCUMENTS

| 4,260,923 A * | 4/1981 | Rawcliffe ............ H02K 3/28 318/773 |
| 2005/0248229 A1* | 11/2005 | Even .................. H02K 3/28 310/201 |

(Continued)

FOREIGN PATENT DOCUMENTS

| CN | 101039057 A | 9/2007 |
| FR | 3051295 A1 | 11/2017 |

(Continued)

OTHER PUBLICATIONS

Heinrich Sequenz: "Elektrische Maschinen" In: Elektrische Maschinen, Vienna, Springer Vienna; Jan. 1, 1971; XP055587301; ISBN: 978-3-7091-7571-2; pp. 265-267 (5 pages).

(Continued)

*Primary Examiner* — Gary A Nash
(74) *Attorney, Agent, or Firm* — Osha Bergman Watanabe & Burton LLP

(57) ABSTRACT

The invention relates primarily to a rotating electrical machine for a motor vehicle including: —a rotor, and—a stator (11) including a winding (17) having a plurality of phases, each phase comprising a plurality of groups of coils (G1-G4), characterized in that said stator (11) is configured such that currents in the groups of coils (G1-G4) are able to flow selectively: —in one and the same direction so as to maximize a number of poles of the rotating electrical machine, or—in opposite directions so as to minimize a number of poles of the rotating electrical machine.

13 Claims, 4 Drawing Sheets

(56) References Cited

U.S. PATENT DOCUMENTS

| | | | |
|---|---|---|---|
| 2009/0039726 A1* | 2/2009 | Westermark | H02K 1/2791 |
| | | | 310/12.21 |
| 2012/0306309 A1* | 12/2012 | Matsubara | H02K 3/28 |
| | | | 310/195 |
| 2012/0313473 A1* | 12/2012 | Chen | H02K 21/12 |
| | | | 310/156.07 |
| 2017/0126082 A1* | 5/2017 | Kusase | H02K 3/28 |
| 2019/0334420 A1 | 10/2019 | Hidaka et al. | |

FOREIGN PATENT DOCUMENTS

| | | |
|---|---|---|
| JP | S50-072104 A | 6/1975 |
| JP | S63-161849 A | 7/1988 |
| JP | H09-215115 A | 8/1997 |
| WO | 2008-135532 A1 | 11/2008 |
| WO | 2018/008057 A1 | 1/2018 |

OTHER PUBLICATIONS

International Search Report and Written Opinion in corresponding International Application No. PCT/EP2019/070222, mailed Oct. 29, 2019 (13 pages).

Office Action issued in Japanese Patent Application No. 2021-504184 mailed on Mar. 17, 2023 (7 pages).

* cited by examiner

ROTARY ELECTRICAL MACHINE WITH AN OPTIMISED CONFIGURATION

The invention relates to a rotary electrical machine with an optimised configuration. The invention has a particularly advantageous, but non-exclusive application with rotary electrical machines which are used in motor vehicles of the electric or hybrid type.

In a known manner, rotary electrical machines comprise a stator and a rotor integral with a shaft. The rotor can be integral with a driving and/or driven shaft, and can belong to a rotary electrical machine in the form of an alternator, an electric motor, or a reversible machine which can operate in both modes.

In the case of an electrical machine of a synchronous type, the rotor comprises a body formed by a stack of metal plate sheets, as well as poles formed by permanent magnets. In the case of an electrical machine of an asynchronous type, the rotor is in the form of a rotor with a cage.

In addition, the stator is fitted in a housing which is configured to rotate the rotor shaft, for example by means of roller bearings. The stator comprises a body provided with a plurality of teeth defining notches, and a winding with a plurality of phases. Each phase comprises a plurality of groups of coils with turns inserted in the notches of the stator.

The number of turns of a phase is equal to the product of the number of turns of a pole and the number of pairs of poles of the electrical machine. It is known that a large number of turns makes it possible to obtain substantial torque during starting, but this torque drops when the speed of the electrical machine increases. This drop in torque is greater for an electrical machine of asynchronous type than for an electrical machine of a synchronous type.

The objective of the invention is to adapt the number of poles of the electrical machine (and thus the number of turns of a phase), in particular in order to limit the drop in torque at high speed.

More specifically, the subject of the invention is a rotary electrical machine for a motor vehicle comprising:
 a rotor; and
 a stator comprising a winding with a plurality of phases, each phase comprising a plurality of groups of coils,
characterised in that the said stator is configured such that currents in the groups of coils can circulate selectively:
 in the same direction so as to maximise a number of poles of the rotary electrical machine; or
 in opposite directions so as to minimise a number of poles of the rotary electrical machine.

Thus, by adapting the number of poles according to the direction of circulation of the current, the invention makes it possible to improve the torque performance of the electrical machine, in particular according to its speed of rotation.

According to one embodiment, the number of poles of the rotary electrical machine is minimised when the speed of rotation of the rotary electrical machine exceeds a threshold.

According to one embodiment, the rotary electrical machine comprises a number of notches per pole and per phase contained between 1 and 8.

According to one embodiment, coils of a group are separated from one another by an angle of $\Pi/2$ radians.

According to one embodiment, two phases are separated from one another by an angle of $2\Pi/3$ radians.

According to one embodiment, the winding is of the distributed type.

According to one embodiment the winding is of the concentrated type.

According to one embodiment, the rotary electrical machine is of the asynchronous type.

According to one embodiment, the rotor is a rotor with a cage.

According to one embodiment, the rotary electrical machine is of the synchronous type.

According to one embodiment, the rotor has permanent magnets.

According to one embodiment, the winding is formed from continuous wires or pins.

According to one embodiment, the stator comprises two radial layers of conductors.

The invention will be better understood by reading the following description and examining the figures which accompany it. These figures are provided purely by way of illustration and in no way limit the invention.

Figure 3A:
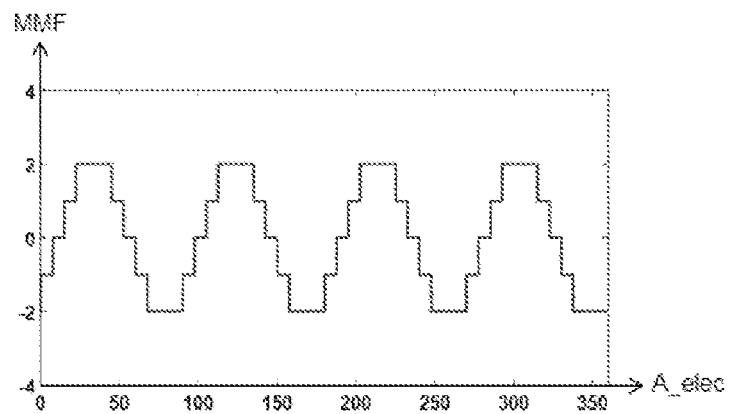
Figure 3B:
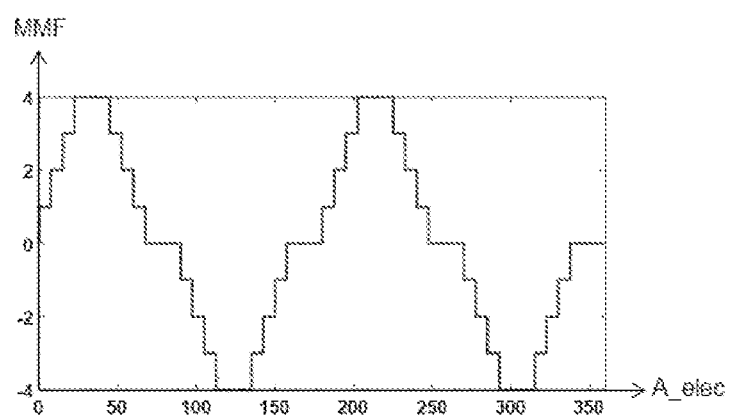
Figure 4A:
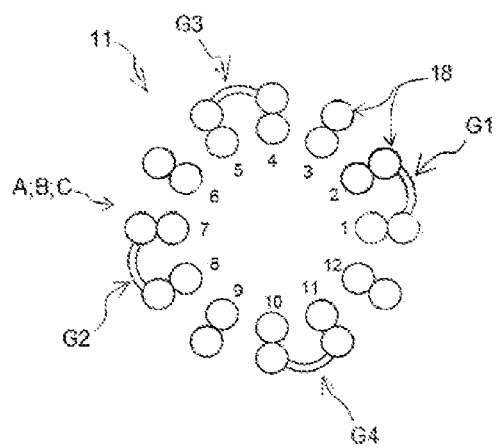
Figure 4B:
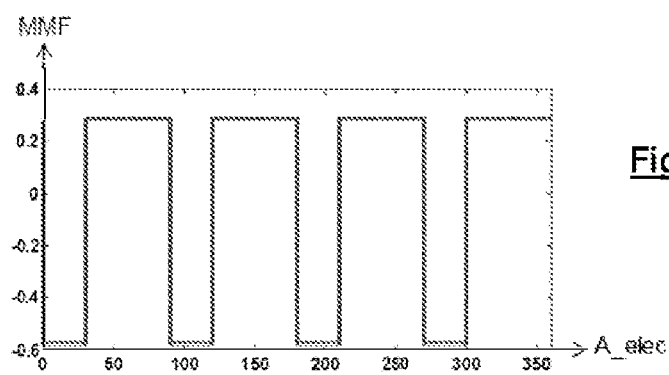
Figure 4C:
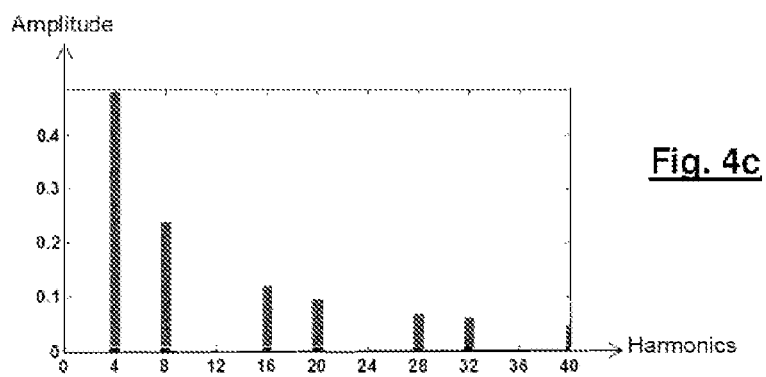
Figure 5A:
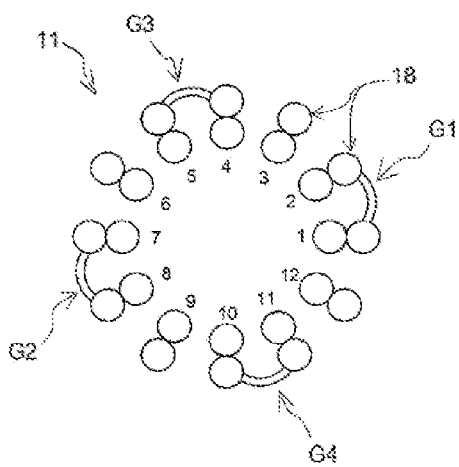
Figure 5B:
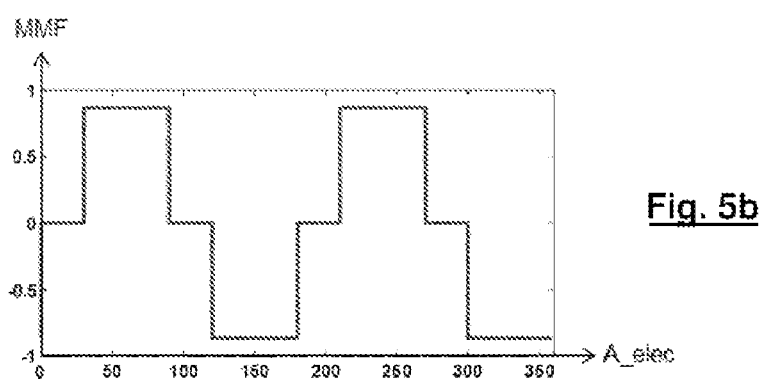
Figure 5C:
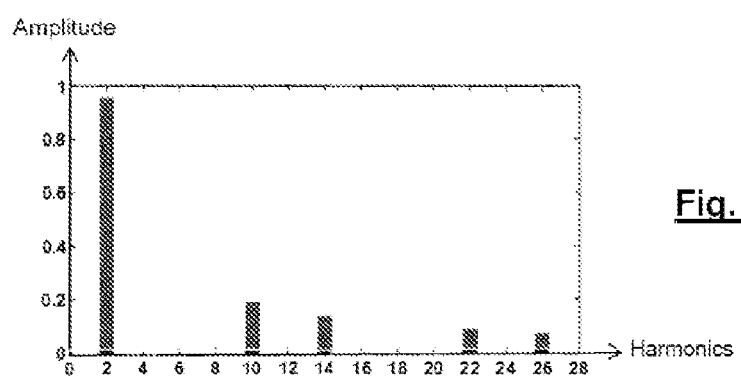

FIGS. 3*a* and 3*b* are graphic representations of the magneto-motive force according to the electrical angle, respectively for an electrical machine with 8 poles and for an electrical machine with 4 poles comprising a distributed winding;

FIGS. 4*a* to 4*c* are respectively a schematic representation of a winding configuration, and graphic representations of the magneto-motive force and of the harmonics for an electrical machine with a concentrated winding with 12 notches and 8 poles;

FIGS. 5*a* to 5*c* are respectively a schematic representation of a winding configuration, and graphic representations of the magneto-motive force and of the harmonics for an electrical machine with a concentrated winding with 12 notches and 4 poles.

Elements which are identical, similar or analogous retain the same reference from one figure to another.

Figure 1:
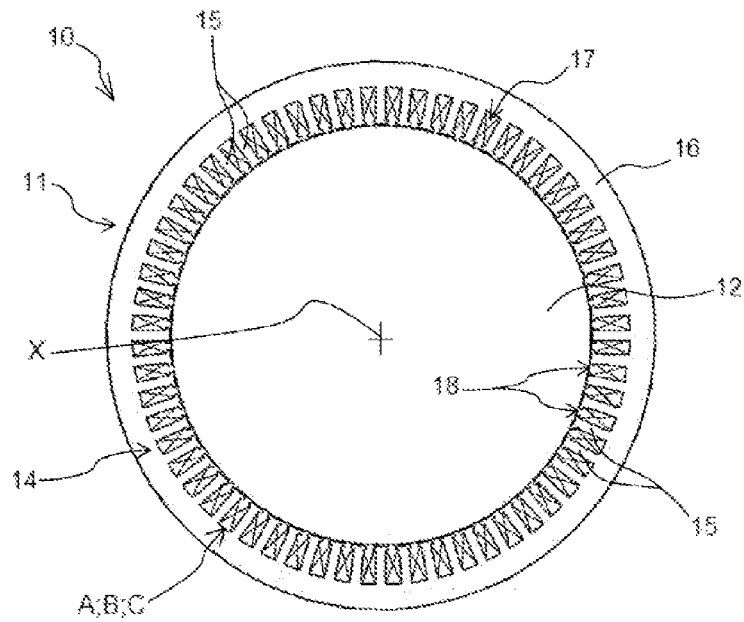
FIG. 1 is a view in transverse cross-section of a rotary electrical machine according to the invention.

FIG. 1 shows a rotary electrical machine 10 comprising a wound stator 11 which can be polyphase, surrounding coaxially a rotor 12 with an axis of rotation X. The stator 11 and the rotor 12 are separated from one another by an air gap extending between the outer periphery of the rotor 12 and the inner periphery of the stator 11. The electrical machine 10 can be of the asynchronous or synchronous type. In the case of an asynchronous machine, the rotor 12 is a rotor with a cage. In the case of a synchronous machine, the rotor 12 can comprise a body formed by an axial stack of flat metal plates, in order to decrease the Foucault currents, as well as poles formed by permanent magnets, in particular made of ferrite or rare earths.

In addition, the stator 11 comprises a body 14 and a winding 17. The stator body 14 consists of an axial stack of flat metal plates. The body 14 comprises teeth 15 obtained from a yoke 16, which teeth are distributed angularly regularly. These teeth 15 delimit notches 18, such that each notch 18 is delimited by two successive teeth 15. The notches 18 open axially into the axial end faces of the stator body 14. The notches 18 are also open radially towards the interior of the stator body 14.

The winding 17 can be formed from pins globally with the form of a "U" or from continuous wires. These conductors are for example made of copper covered with a layer of insulating material, such as enamel. The conductors of the winding 17 can be placed according to a first radial layer C1 of conductors at the base of the notch which is closest to the yoke 16, and according to a second radial layer C2 of conductors which is closest to the air gap, as shown in FIG. 2.

The winding 17 comprises a plurality of phases A, B, C. Each phase comprises a plurality of groups of coils G1-G4. The stator 11 is configured such that currents in the groups of coils G1-G4 can circulate selectively in the same direction, such as to maximise a number of poles of the electrical machine 10, or in opposite directions, such as to minimise a number of poles of the electrical machine 10.

Figure 2:
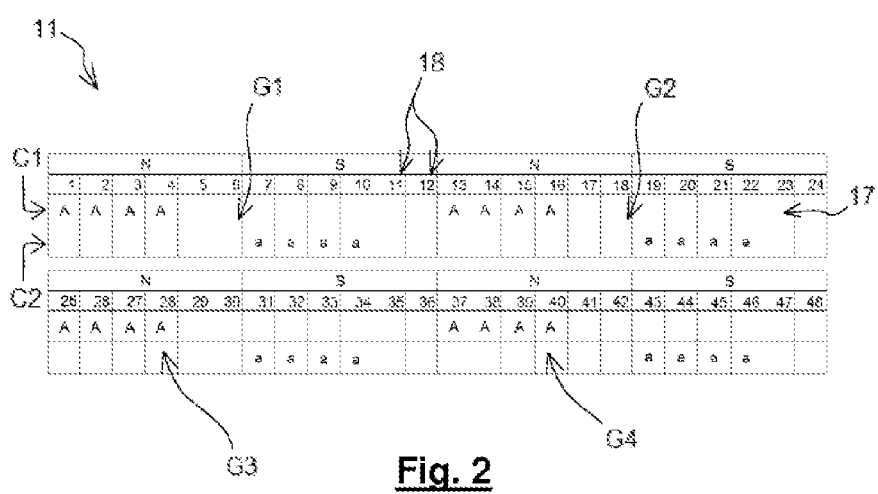
FIG. 2 is a schematic representation of the distribution according to the invention of a phase of a winding in the notches of a stator represented linearly.

FIG. 2 illustrates the distribution of the phase A of a distributed winding 17 comprising groups of coils G1-G4 for a machine with 48 notches, 8 poles, and 3 phases, i.e. 2 notches per pole and per phase. More generally, the electrical machine 10 can comprise a number of notches per pole and per phase contained between 1 and 8. The upper case letter A corresponds to the input area of the current for the North poles (N) and the lower case letter a corresponds to the corresponding output area of the current for the South poles (S).

Coils of a group G1-G4 are separated from one another by an angle of Π/2 radians. The two other faces B and C are formed in a manner similar to the phase A. Two phases are separated from one another by an angle of 2Π/3 radians.

The currents in the groups of coils G1-G4 can circulate in the same direction or in opposite directions, in order to adapt the number of poles of the electrical machine 10.

The diagram of the magneto-motive force MMF according to an electrical angle A_elec is represented in FIG. 3a when the current circulates in the same direction in the groups of coils G1-G4, in order to obtain 8 poles. The diagram of the magneto-motive form[1] MMF is represented in FIG. 3b when the direction of the current is inverted, and the coils are put into parallel in order to obtain 4 poles. This therefore allows the electrical machine 10 to operate as a machine with 4 poles or with 8 poles, by changing the direction of circulation of the currents.

The operation with a reduced number of poles is advantageously implemented when the speed of rotation of the electrical machine 10 exceeds a threshold.

Alternatively, the winding 17 is of the concentrated type, i.e. it is formed from coils which are wound around corresponding teeth 15 of the stator 11, and are placed in the interior of corresponding notches 18. A configuration of this type makes it possible to reduce the length of the winding of the machine.

FIGS. 4a and 5a show an embodiment of a machine with a concentrated winding with 12 notches and 8 poles. Each phase A, B, C is formed from two groups of coils G1-G4. Thus, the coils in the notches 1, 2 and 7, 8 form the groups of coils G1-G2 of a phase, and the coils in the notches 4, 5 and 10, 11 form the groups of coils G3-G4 of another phase.

By making the current circulate in the same direction in the groups of coils G1-G4, the diagram of the electromotive force with 8 poles is obtained according to the electrical angle A_elec shown in FIG. 4b. FIG. 4c shows that the dominant harmonic is the harmonic of order 4.

In order to obtain a different number of poles, the current is inverted in the groups of coils G1-G4 of the different phases, and the diagram of the electromotive force with 4 poles shown in FIG. 5b is obtained. The dominant harmonic is then the harmonic of order 2, as illustrated by FIG. 5c.

It will be appreciated that the foregoing description has been provided purely by way of example, and does not limit the field of the invention, a departure from which would not be constituted by replacing the different elements by any other equivalents.

In addition, the different characteristics, variants, and/or embodiments of the present invention can be associated with one another according to different combinations, provided that they are not incompatible or mutually exclusive.

The invention claimed is:

1. A rotary electrical machine for a motor vehicle comprising:
   a rotor; and
   a stator comprising a winding with a plurality of phases, each phase comprising a plurality of groups of coils, wherein said stator is configured such that currents in the groups of coils circulate selectively:
      in the same direction so as to maximise a number of poles of the rotary electrical machine; or
      in opposite directions so as to minimise a number of poles of the rotary electrical machine, and
   wherein the number of poles of the rotary electrical machine is determined based on a speed of rotation of the rotary electrical machine.

2. The rotary electrical machine according to claim 1, wherein the number of poles of the electrical machine is minimised when the speed of rotation of the rotary electrical machine exceeds a threshold.

3. The rotary electrical machine according to claim 1, further comprising a number of notches per pole and per phase contained between 1 and 8.

4. The rotary electrical machine according to claim 1, wherein coils of a group are separated from one another by an angle of Π/2 radians.

5. The rotary electrical machine according to claim 1, wherein two phases are separated from one another by an angle of 2Π/3 radians.

6. The rotary electrical machine according to claim 1, wherein the winding is of the distributed type.

7. The rotary electrical machine according to claim 1, wherein the winding is of the concentrated type.

8. The rotary electrical machine according to claim 1, wherein the rotary electrical machine is of the asynchronous type.

9. The rotary electrical machine according to claim 8, wherein the rotor is a rotor with a cage.

10. The rotary electrical machine according to claim 1, wherein the rotary electrical machine is of the synchronous type.

11. The rotary electrical machine according to claim 10, wherein the rotor has permanent magnets.

12. The rotary electrical machine according to claim 1, wherein the winding is formed from continuous wires or pins.

13. The rotary electrical machine according to claim 1, wherein the stator comprises two radial layers of conductor.

* * * * *